United States Patent [19]

Thornton et al.

[11] Patent Number: 4,661,132
[45] Date of Patent: Apr. 28, 1987

[54] THEMALLY FORMED GRADIENT DENSITY FILTER

[75] Inventors: Donald I. Thornton, Warwick; Clarke A. Rodman, East Providence, both of R.I.

[73] Assignee: Allied Corporation, Morristown, N.J.

[21] Appl. No.: 765,782

[22] Filed: Aug. 15, 1985

[51] Int. Cl.⁴ ............................................. B01D 46/02
[52] U.S. Cl. ..................................... 55/486; 55/528; 156/167; 210/496; 264/DIG. 48
[58] Field of Search ................ 55/486, 487, 526, 528, 55/DIG. 5; 156/167; 210/491, 496, 508; 264/48, 122, DIG. 48, 126

[56] References Cited

U.S. PATENT DOCUMENTS

| | | | |
|---|---|---|---|
| 2,539,768 | 1/1951 | Anderson | 210/496 |
| 2,576,864 | 11/1951 | Valente | 210/491 |
| 2,963,744 | 12/1960 | Cooper | 210/508 |
| 3,003,643 | 10/1961 | Thomas | 210/491 |
| 3,073,735 | 1/1963 | Till et al. | 156/38 |
| 3,251,475 | 5/1966 | Till et al. | 210/508 |
| 3,261,473 | 7/1966 | Riede | 210/282 |
| 3,347,391 | 10/1967 | Steensen | 210/491 |
| 3,352,423 | 11/1967 | Osterman | 210/496 |
| 3,526,557 | 9/1970 | Taylor | 156/167 |
| 3,538,020 | 11/1970 | Heskett et al. | 210/496 |
| 3,680,709 | 8/1972 | Snow | 210/496 X |
| 3,759,393 | 9/1973 | Tate et al. | 210/491 |
| 3,816,233 | 6/1974 | Powers | 264/48 |
| 4,119,543 | 10/1978 | Lawson et al. | 210/496 |
| 4,230,463 | 10/1980 | Henis et al. | 55/16 |
| 4,234,326 | 11/1980 | Bailey et al. | 55/521 X |

FOREIGN PATENT DOCUMENTS 2061174 9/1980 United Kingdom .

Primary Examiner—Charles Hart
Attorney, Agent, or Firm—Ken C. Decker; William N. Antonis

[57] ABSTRACT

A fluid filter is formed by producing an air laid nonwoven batt comprising a randomly arranged mixture of thermoplastic fibers and fibers which are not thermoplastic. The batt is then cut into sections, and portions of the batt are heated to a temperature sufficient to partially fuse the fibers, thereby increasing the density of the portion of the batt which is heated. Accordingly, a gradient density filter may be produced having a progressively greater density from the fluid receiving side to the fluid expressing side, so that larger particles are trapped at the fluid receiving side and progressively smaller particles are trapped as the fluid flows through the media, with the finest particles being trapped at the fluid expressing side.

12 Claims, 10 Drawing Figures

THERMALLY FORMED GRADIENT DENSITY FILTER

This invention relates to a fluid filter in which the density of the media gradually increases in the direction of fluid flow therethrough.

Most existing fluid filters use a pleated paper media supported by a centertube and closed at the column ends by end caps which are bonded to the ends of the pleated paper. It is also necessary to close the pleats by use of a metal clip or an adhesive. The many different parts involved and the necessary labor needed to assemble these parts are relatively expensive. Furthermore, it is generally desirable that the density of the filtering media change so that it becomes gradually more dense in the direction of fluid flow. Accordingly, larger particles can be trapped by the less dense media just as the fluid enters the filter and the finer particles can be trapped by the more dense media just before the fluid flow exits the filter.

The present invention uses an air laid batt material comprised of a randomly arrayed mixture of thermoplastic fibers and fibers which are not thermoplastic (or a batt made from fibers which are not thermoplastic which is impregnated with a thermoset binder). The batt is cut in the desired shape and then formed into a filter. By selectively applying heat and/or pressure to selected portions of the media, the portions to which heat or pressure are applied can be densified by fusing the thermoplastic fibers contained therein. Accordingly, a gradient density filter can be formed. If the heated portion of the media is heated and compressed sufficiently, the thermoplastic fibers fuse sufficiently to form a stiffened portion of the media that is structurally self-supporting. Accordingly, the centertubes, metal clips, etc., are eliminated.

These and other features of the invention will become apparent from the following description, with reference to the accompanying drawings, in which.

Figure 3:
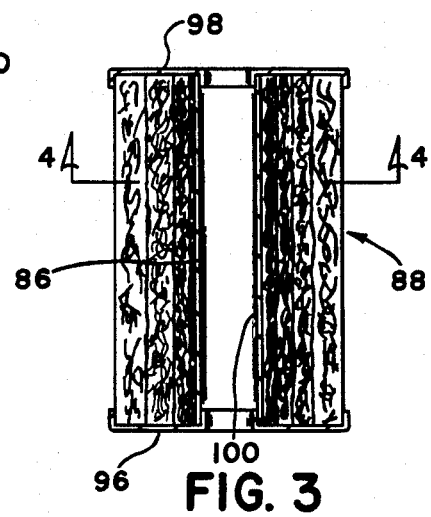
FIG. 3 is a longitudinal cross sectional view of the filter made pursuant to the process illustrated in FIG. 2.
Figure 4:
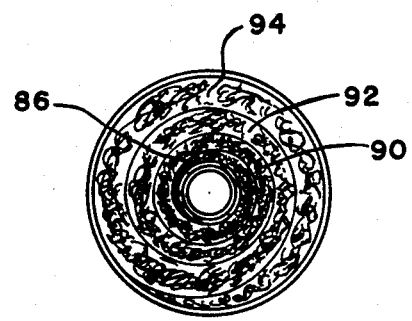
FIG. 4 is a cross sectional view taken substantially along lines 4—4 of FIG. 3.

Each of the embodiments of the present invention used as a starting material an air laid batt which consists of a randomly arrayed mixture of thermoplastic fibers, such as vinyl fibers or fibers made from a thermal setting resin and fibers which are not thermoplastic, such as wood pulp fibers or textile fibers. The air laid batt is produced by the machine 20 illustrated in FIG. 1 which will be described in detail hereinafter. In the embodiment of FIGS. 3 and 4, the batt produced by the machine 20 is wrapped around a heated mandrel. In the embodiment of FIGS. 5–8, the batt is die cut into discs with a central aperture therein. A heated mandrel is passed through the central aperture to densify the portion of the disc adjacent thereto, and the discs are then assembled to a filter by stacking them upon one another.

Figure 1:
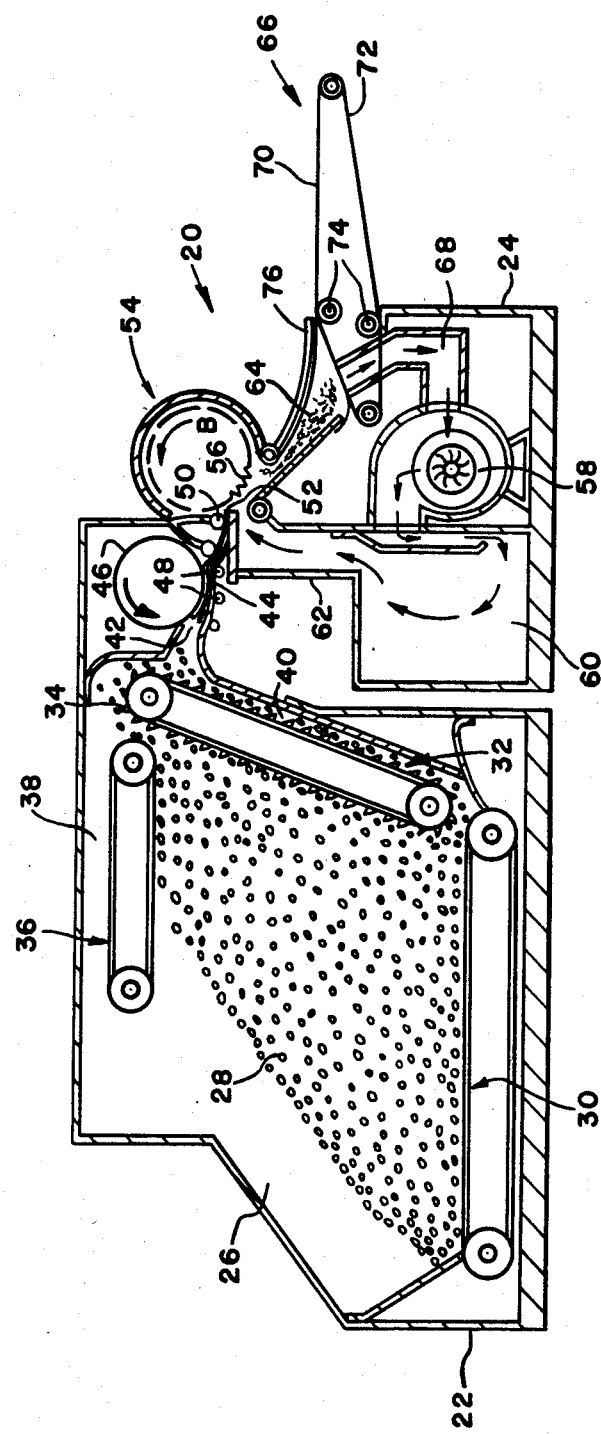
FIG. 1 is a cross sectional illustration of the machine used to produce an air laid batt or mat used in the present invention.

As illustrated in FIG. 1, an air laid nonwoven batt formation machine generally indicated by the numeral 20, of the type available commercially from the Rando Machine Corporation and generally illustrated in U.S. Pat. No. 3,918,126, includes two relatively large housings 22, 24. The housing 22 includes a relatively large hopper 26 which receives a fiber mixture generally indicated by the numeral 28. The fiber mixture 28 includes both thermoplastic fibers, such as vinyl fibers, or fibers made from a thermal setting resin and fibers which are not thermoplastic, such as, for example, wood pulp fibers or textile fibers. Although a wide range of the relative quantities of the different types of fibers is possible, it has been found that a mixture of about 30% thermoplastic fibers and the rest non-thermoplastic fibers achieves satisfactory results. A conveying apron 30 is operated by an appropriate power source (not shown) to move the fibers 28 to the right, viewing FIG. 2, toward an elevating apron generally indicated by the numeral 32. The elevating apron 32 is provided with spikes 34 so that the apron 32 conveys the fibers upwardly, viewing FIG. 1. A stripper apron generally indicated by the numeral 36 is mounted in the upper part of the hopper 26, viewing FIG. 2. A blower (not shown) provides metered air flow through the channel 38 defined between the upper race of the apron 36 and the corresponding portion of the housing 22. The metered air flow through the channel 38 removes fibers at a predetermined rate from the elevating apron 32. The remaining fibers are returned to the hopper 26 through the channel 40. The metered air flow passing through the channel 38 forces the other fibers into a duct 42. The air flow through the duct 42 enters a porous condensor screen 46 which is rotated in the direction indicated by the arrow A. The feed mat 44 is formed between the screen 46 and mechanical rolls 48. The feed mat 44 is transferred by the mechanical rolls 48 to a feed roll 50 and is then passed over a conventional serrated nose bar 52. The fibers are brushed off the nose bar 52 by a conventional lickerin generally indicated by the numeral 54. The lickerin 54 is provided with a serrated surface defining spikes or teeth 56 across the entire width and around the circumference of the lickerin 54. The lickerin 54 is powered for rotation as indicated by the arrow B in FIG. 1.

The fibers are doffed from the lickerin 54 by the centrifugal forces generated by the rotating speed of the lickerin 54 and also by air flow provided by a blower 58. The blower 58 blows air into a chamber 60 defined within the housing 24. The air flow from the blower 58 is guided through a duct 62, around a portion of the surface of the lickerin 54, and into a duct 64. The fibers are removed from the lickerin and are conveyed by the air stream from blower 58 through the duct 64 to a foraminous conveyor generally indicated by the numeral 66. The inlet of the blower 58 is connected to a duct 68 which communicates with the duct 64 through a foraminous belt 70 comprising a part of the conveyor 66. Since the belt 70 is porous and permits air flow therethrough, the blower 58 is capable of circulating air through the ducts 62, 64 and 68. The foraminous belt 70 is mounted on guide rollers 72 which are driven by an appropriate motor (not shown). The nonwoven web or mat is formed on the foraminous belt 70 which includes a portion 74 extending from the dust cover 76 to permit ready removal of the batt as it is formed. Accordingly, the completed batt can be removed from the foraminous belt 70.

Figure 2:
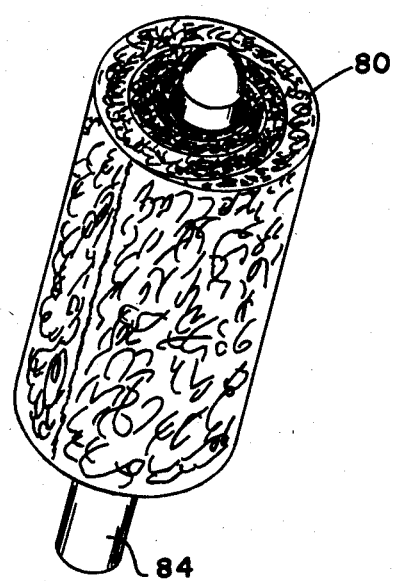
FIG. 2 is a perspective illustration of the manner of which one embodiment of a filter made pursuant to the teachings of the present invention is manufactured.

Referring now to the embodiment of FIGS. 2, 3 and 4, a section of the batt produced by the machine 20 is cut and wound about a heated mandrel 84. As the section 80 is wound about the mandrel, the tension applied to the batt section 80 is initially relatively high, so that the section of the batt engaging the mandrel is both heated to a relatively high temperature and is maintained under a relatively high pressure. As the batt is wrapped around the mandrel in a spiral fashion illustrated in FIGS. 2 and 4, the tension on the batt section 80 is progressively released. Since the outer layers of the batt are further and further away from the mandrel, they will be heated to only a progressively lower temperature as the batt is wrapped around the mandrel. Accordingly, the portion 86 of the batt adjacent the inner circumferential surface of the filter 88 produced thereby will be heated to the highest temperature and will be under the greatest pressure. This portion of the batt will have the lowest permeability, so that very fine particles will be filtered by this portion of the batt. Furthermore, this portion of the batt will be the stiffest portion of the filter. As the progressively wound spirals 90, 92 are wrapped around the mandrel, these sections will be under progressively less tension. Since the density is a function of both the pressure and temperature applied to the batt, the portion 94 furtherst away from the center of the filter 88 will be of relatively low density and will have relatively high permeability, so that only the larger particles will be trapped in this layer. The layers 90 and 92 intermediate to the layers 86 and 94 will trap progressively smaller particles, since they are of progressively greater density. The conventional end caps 96, 98 are installed, and, if necessary, a centertube 100 may also be used to assure proper support of the filter. However, as discussed above, the stiffness of the filtering media is increased under increased conditions of temperature and pressure. Accordingly, if the innermost layer 86 is treated under sufficiently great conditions of temperature and pressure, it becomes stiff enough to provide a structurally self-supporting filter, thus permitting elimination of the centertube 100. Even though the innermost layer 86 is sufficiently stiffened that the filter is self-supporting, it retains sufficient permeability to permit fluid flow therethrough. Of course, the temperature and pressure cannot be so great as to stiffen the innermost layer 86 to such a degree that it turns into a solid plastic which is impermeable to fluid flow. The completed cartridge 88 is then installed in the appropriate metal housing (not shown) to provide a completed filter.

Referring now to the embodiment of FIGS. 5-8, the batt material produced by the machine 20 is cut into wafers or discs generally indicated by the numeral 102 by an appropriate die cutting machine (not shown). The wafers or discs 102 are provided with a central aperture 104 and with serrations 106 around the outer diameter.

Figure 5:
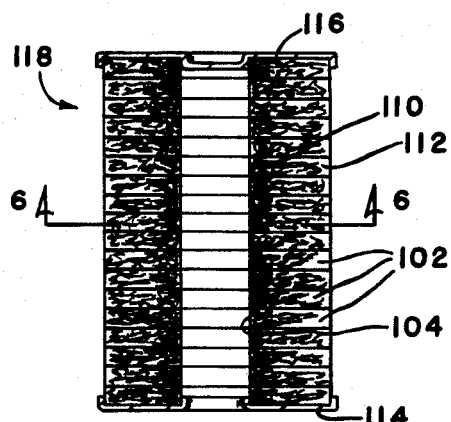
FIG. 5 is a longitudinal cross sectional view of another embodiment of a filter made pursuant to the teachings of the present invention.
Figure 6:
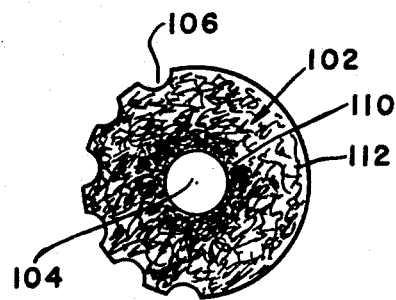
FIG. 6 is a cross sectional view taken substantially along lines 6—6 of FIG. 5.
Figure 7:
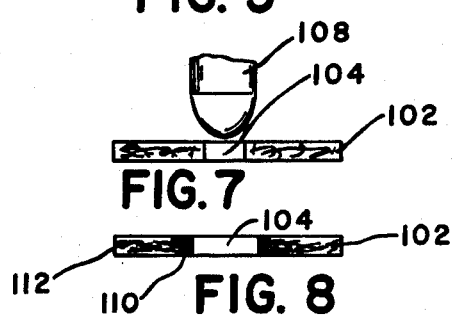
FIG. 7 is a diagrammatic illustration of how the disc used in making the filter illustrated in FIGS. 5 and 6 is formed.
Figure 8:
FIG. 8 is a cross sectional view of the disc after it is formed by the process illustrated in FIG. 7.

As discussed hereinabove, the batt produced by the machine 20 includes thermoplastic fibers which may be fused and therefore stiffened and densified by the application of heat or pressure. Accordingly, a heated mandrel generally indicated by the numeral 108 is plunged through the central aperture 104 of each of the discs 102, thereby densifying the inner circumferential portion 110 of each disc. By fusing the fibers adjacent the central aperture 104, the permeability of that portion of the disc is decreased, so that portion of the disc is able to trap smaller particles entrained in the fluid to be filtered, as will be described in detail hereinafter. Also described hereinabove, by heating a portion of the batt produced by the machine 20, that portion is not only densified and the permeability decreased, it is also stiffened. Accordingly, it is a feature of the present invention that the mandrel 108 heats the portion of the disc 102 adjacent the central aperture 104 to a temperature hot enough to fuse the fibers so that that portion of the disc is sufficiently stiff that the disc can be stacked upon one another as indicated in FIG. 5, but not so much that the portion 110 becomes impermeable to fluid flow. It is to be noted that the density of the disc increases gradually from the outer circumference 112 thereof to the portion 110 thereof because the intermediate portion of the disc is further away from the heated mandrel 108 when the disc 102 is treated thereby, so that the portions of the disc are heated to a progressively lower temperature from the highest temperature at the portion 110 thereof to the lowest temperature at the outer portion 112 thereof. Since the disc becomes progressively greater density as fluid flows from the outer portion 112 to inner portion 110 thereof, progressively smaller particles will be trapped by the disc. This is very desirable from a filtration standpoint because it is always desirable to trap the larger particles first in a less dense media while keeping the larger particles out of the denser media so that the finer particles may be more efficiently trapped.

The discs 102 are stacked upon one another as illustrated in FIG. 5, and conventional metal end caps 114, 116 are used to seal the ends of the completed filter element generally indicated by the numeral 118. The completed filter element 118 is then installed in a conventional metal can (not shown). Alternatively, one of the end caps 114 may be installed in the metal can and the discs 102 can be stacked directly in the can. If the discs are stacked such that the outer circumferential surface 120 of the disc engages the wall of the can, the serrations 106 permit fluid flow along the outer circumferential surface 120 of the filter to permit fluid to flow under the filter where it may be filtered.

Figure 9:
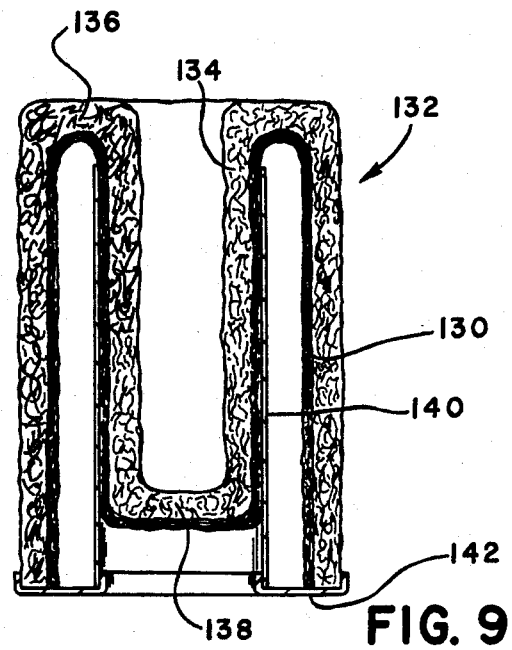
FIG. 9 is a cross sectional view of a filter made pursuant to yet another embodiment of the present invention.
Figure 10:
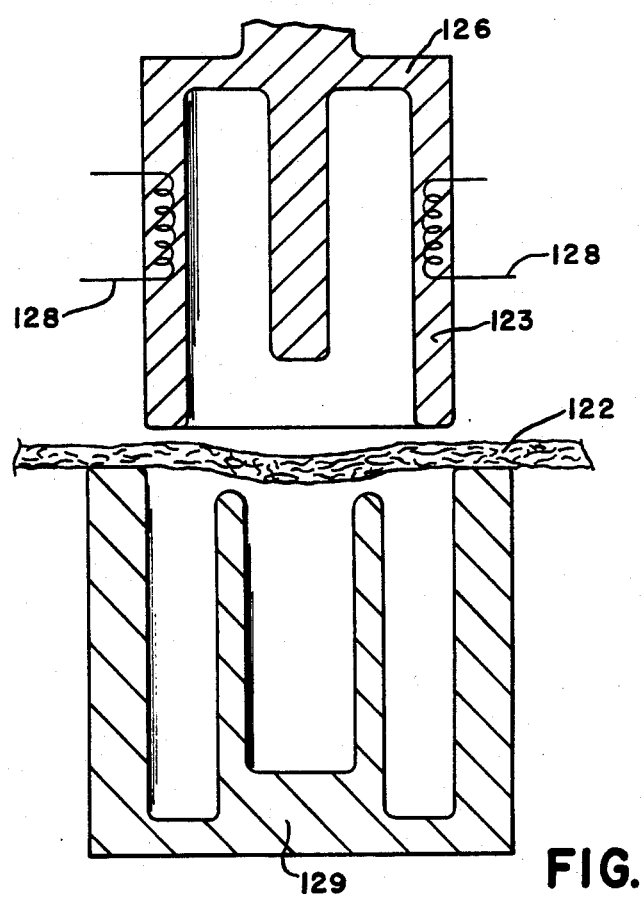
FIG. 10 is a cross sectional view of the mold set used to manufacture the filter illustrated in FIG. 9.

Referring now to the embodiment of FIGS. 9 and 10, a batt section 122 formed by the machine 20 is installed between an open center mold 124 and a correspondingly-shaped plunger 126. An electrical resistance heater indicated diagrammatically as at 128 maintains the plunger 126 at a predetermined temperature, while the temperature of the mold 124 is maintained at room temperature. Referring to FIG. 9, which illustrates the completed filter element, the portion 130 of the media generally indicated by the numeral 132 was adjacent the circumferentially-extending, heated portion 23 of the plunger 126 while the outer portion indicated by the numeral 134 of the batt section 122 was adjacent the plunger 126 as the filter was formed, which was maintained at room temperature. Accordingly, the batt section 122 was formed into the article 132 illustrated in FIG. 9, with circumferentially-extending pleats 136 and 138. Although the portion 130 is sufficiently stiff so that the article is at least partially self-supporting, a perforated centertube is indicated as at 140 to provide additional support. A conventional end cap 142 is installed on the article 132. As illustrated by the arrows in FIG. 9, fluid first flows through the fluid receiving side or outer surface 134 of the filter 132 and exits through the fluid expressing side at the inner part of the filter 130. The density of the media gradually increases between the fluid receiving and fluid expressing sides. Accordingly, the larger particles trapped in the less dense portion adjacent the fluid receiving side of the filter, and the finer particles are trapped in the more dense media adjacent the fluid expressing side of the filter. Of course, the filter element 132 must be installed in the appropriate metal can (not shown).

By way of illustration, but not by way of limiting the invention, there may be given the following example:

Using the apparatus of FIG. 1, an air laid batt is manufactured consisting of about 30 percent of fibers made from a vinyl polymer, known commercially as vinyon, and with the remainder wood pulp fibers. The batt is then cut into sections as described hereinabove. Referring to the embodiment of FIGS. 2-4, the batt section is wrapped around a mandrel heated to a temperature of about 300° F. Referring to the embodiment of FIGS. 5-8, the batt is cut into the discs 102 which are treated with a mandrel heated to a temperature of about 300° F., and which has a diameter of about 20 percent larger than the initial diameter of the aperture 104 of the untreated discs 102. The discs are then stacked and installed in the appropriate metal can as described hereinabove. Referring to the example of FIGS. 9 and 10, the batt section is formed in the mold heated to a temperature of about 300° F. and under a pressure of 2,000 pounds per square inch, while maintaining the plunger at room temperature.

We claim:

1. Method of forming a fluid filter comprising the steps of forming a nonwoven batt comprising a randomly arrayed mixture of a thermoplastic material and fibers which are not thermoplastic, shaping said batt into the desired shape of a fluid filter, and heating only a selected portion of said batt while molding the latter into said desired filter shape and while maintaining the rest of said batt other than the selected portion at a temperature less than the temperature of said selected portion to thereby permit softening and fusing of the thermoplastic material at said selected portion to thereby increase the stiffness and decrease the permeability of said selected portion, said step of heating and molding said batt being initiated only after formation of the batt has been completed.

2. Method as claimed in claim 1, wherein said method includes the step of simultaneously applying pressure to said selected portion while heating said selected portion.

3. Method as claimed in claim 1, wherein said selected portion is heated by wrapping said batt around a heated mandrel.

4. Method as claimed in claim 1, wherein said batt is maintained under tension as it is wrapped around said mandrel and the tension on the batt is progressively reduced as successive layers of said batt are wrapped around the mandrel.

5. Method as claimed in claim 1, including the steps of cutting said batt into discs having a concentric aperture extending axially therethrough, passing a heated mandrel through said aperture to increase the stiffness and decrease the permeability of the portion of each disc adjacent said aperture, said portion of each disc adjacent said aperture being said selected portion, and stacking said discs upon one another with their central aperture aligned to form an elongated filter with a central passage therethrough.

6. Method as claimed in claim 5, wherein said portion of each disc adjacent said aperture is stiffened sufficiently so that said discs are structurally self-supporting when stacked upon one another while maintaining sufficient permeability to permit fluid to pass therethrough.

7. Method as claimed in claim 1, including the step of forcing said batt into a mold member by another member and heating one of said members to a higher temperature while maintaining the other member at a temperature less than the heated member, said selected portion of the batt being that portion adjacent the heated member.

8. Fluid filter including filtering media comprising a batt of a nonwoven mixture of a thermoplastic material and fibers that are not thermoplastic, said fibers crossing one another randomly, said filtering media having inner and outer circumferential surfaces, the density and stiffness of said media increasing from one of said surfaces to the other surface in the direction of fluid flow through the media wherein the media at said one surface is readily permeable to the fluid being filtered and the media at said other surface is substantially less permeable to the fluid being filtered than is the media at said one surface, and the stiffness of the media between said surfaces increases between said one surface and the other surface, said surfaces including inner and outer circumferential surfaces, said batt being wound in layers in a spiral pattern around said inner circumferential surface with the most dense portion of the batt adjacent the inner circumferential surface, the depth of each layer of the batt would aroung the inner circumferential surface increasing as the batt is wound so that the depth of the layer of the batt at the inner circumferential surface is smallest and the depth of the layer of batt at the outer circumferential surface is greatest with the layers therebetween increasing proportionally.

9. Fluid filter including filtering media comprising a batt of a nonwoven mixture of a thermoplastic material and fibers that are not thermoplastic, said fibers crossing one another randomly, said filtering media having inner and outer circumferential surfaces, the density and stiffness of said media increasing from one of said surfaces to the other surface in the direction of fluid flow through the media wherein the media at said one surface is readily permeable to the fluid being filtered and the media at said other surface is substantially less permeable to the fluid being filtered than is the media at said one surface, and the stiffness of the media between said surfaces increases between said one surface and the other surface, said batt being formed into discs having a central aperture therethrough and said discs being stacked upon one another to define said fluid filter, each of said discs having an outer circumferential edge and an inner circumferential edge, the density and stiffness of said discs increasing from one of said edges to the other edge in the direction of fluid flow through the discs, the edges of said discs defining said inner and outer surfaces of said filtering media.

10. Fluid filter as claimed in claim 9, wherein said discs having a greater density and stiffness adjacent said aperture and a lesser density and stiffness away from said aperture.

11. Fluid filter including filtering media comprising a batt of a nonwoven mixture of a thermoplastic material and fibers that are not thermoplastic, said fibers crossing one another randomly, said filtering media having inner and outer circumferential surfaces, the density and stiffness of said media increasing from one of said surfaces to the other surface in the direction of fluid flow through the media wherein the media at said one surface is readily permeable to the fluid being filtered and the media at said other surface is substantially less permeable to the fluid being filtered than is the media at said one surface, and the stiffness of the media between said surfaces increases between said one surface and the other surface, said filter being molded into a shape retaining structure having pleats extending circumferentially across said filter, said pleats having fluid receiving and fluid expressing sides, the density and stiffness of the fluid expressing sides of said pleats being greater than the density and stiffness of the fluid receiving sides of said pleats.

12. Fluid filter as claimed in claim 11, wherein a perforated centertube supports at least one of said pleats.

* * * * *